RAYMOND T. GAGE
CHARLES BELSKY
INVENTORS

Dec. 5, 1967   C. BELSKY ET AL   3,356,409
SLIDING CONSOLE
Filed Sept. 9, 1965   2 Sheets-Sheet 2
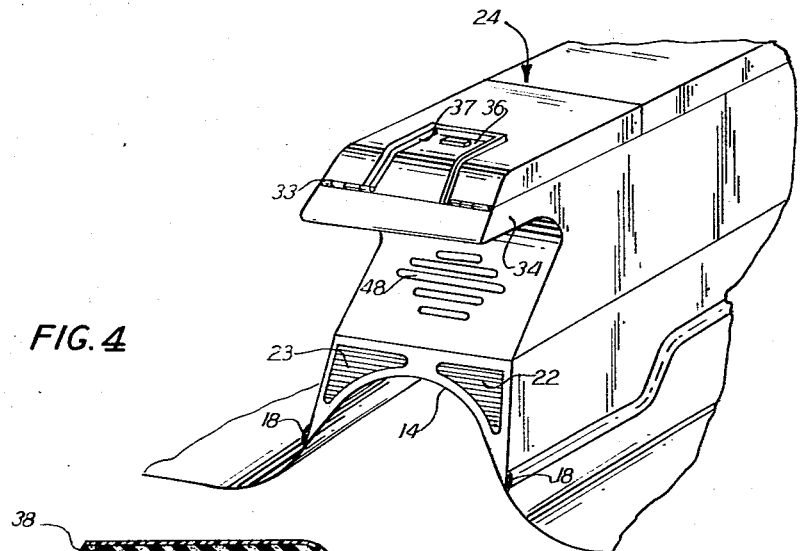
FIG. 4
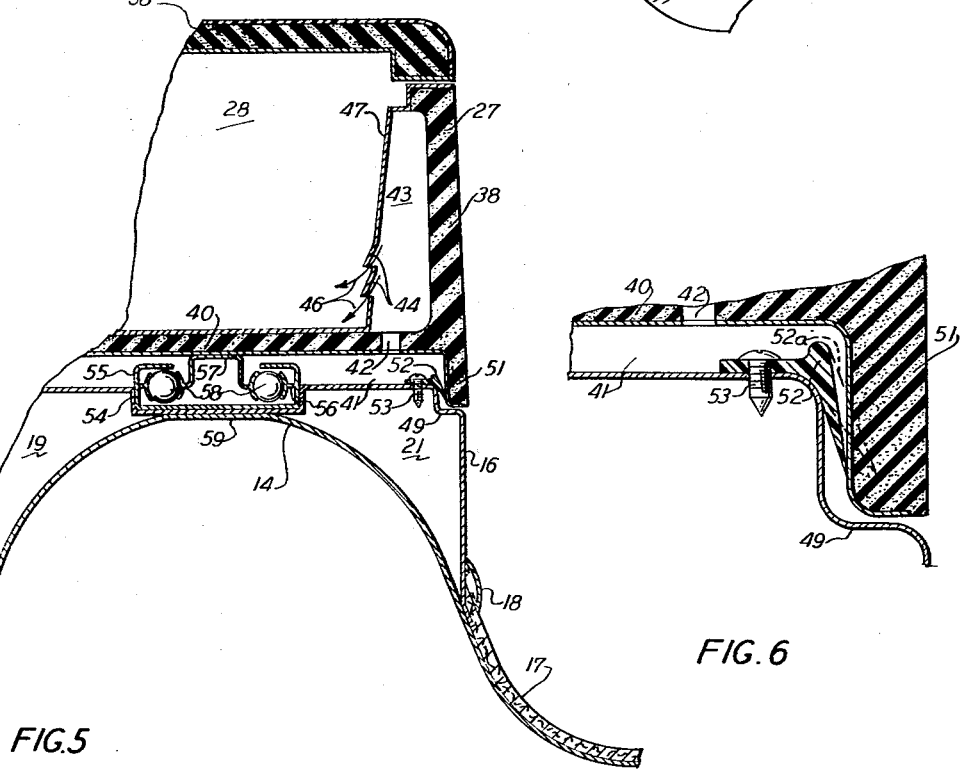
FIG. 5
FIG. 6
RAYMOND T. GAGE
CHARLES BELSKY
INVENTORS,
BY John R. Faulkner
John J. Roethel
ATTORNEYS United States Patent Office 3,356,409
Patented Dec. 5, 1967

3,356,409
SLIDING CONSOLE
Charles Belsky, Detroit, and Raymond T. Gage, Dearborn, Mich., assignors to Ford Motor Company, Dearborn, Mich., a corporation of Delaware
Filed Sept. 9, 1965, Ser. No. 485,993
7 Claims. (Cl. 296—24)

ABSTRACT OF THE DISCLOSURE

A console between two vehicle bucket-type seats having a body that is slidable from a position between said seats to a position rearward of said seats. A pair of ventilation passages extend lengthwise through the console and are connected by valve means to an insulated storage compartment within the console main body.

This invention relates to a vehicle body having a passenger compartment equipped with bucket seats and more particularly to a novel console divider positioned between the seats.

In recent years, there has been an increasing demand by the vehicle purchasing public for sport and sporty-type vehicles. There is also present a demand for sport or sporty-type passenger compartments in conventional vehicles. These demands have occasioned the extensive use of bucket-type seats.

In keeping with the sporty motif of such vehicles, and to add pleasing styling characteristics to the passenger compartment, a dividing console is oft times positioned between the bucket seats. These consoles, as well as adding pleasing styling qualities to the passenger compartments, also provide storage space in their bodies.

The use of the dividing console gives rise to inherent design problems. If the console body is made large enough to provide significant storage space, it is extremely difficult, if not impossible, for a vehicle passenger to move from one side of the passenger compartment to the other. Furthermore, the console structure renders difficult the passage of warm or cool air from the vehicle heater or air conditioner to the rear portion of the passenger compartment.

The advance of the passenger vehicle into an increasingly greater segment of contemporary life has necessitated the transportation of such consumables as food and drink in the vehicle. Picnics, cookouts, and other outings all require that consumables be transported while maintained at some desired temperature. A similar requirement is necessary due to the patronage of the motoring public of such establishments as carry-out and drive-in restaurants.

It is, therefore, an object of this invention to provide a console divider having a body movable between the bucket seats of a passenger compartment from the conventional position of the console to alternative positions.

A further object of this invention is to provide a console division which facilitates the passage of air from the temperature control systems of the vehicle to the rear portion of the passenger compartments.

Still another object of this invention is to provide a console divider having a cavity in the console body which can be maintained at a desired temperature.

The console divider contemplated by the present invention consists of a console body mounted on a bracket which is attached to the tunnel of the passenger compartment of the vehicle. The console body and bracket have mounted therein cooperating slide tracks for permitting horizontal, longitudinal movement of the console body lengthwise between the seats of the passenger compartment. The console division has at least one longitudinal air passage extending lengthwise through the console assembly for conveying air from the front portion of the passenger compartment to the rear portion thereof. Formed in the console body is a cavity connected to the air passage by an inlet valve so that air from the passage may be circulated through the cavity. The console body is constructed of insulating material and has in the rear wall thereof a vent for the exit of the air from the cavity to the rear portion of the passenger compartment. Means are also provided for blocking the passage of air through the air passage, thereby increasing the flow of air through the inlet valve and cavity.

Further objects and advantages of this invention will become apparent when considered in conjunction with the following description of the drawings which illustrate the console division of this invention, and wherein:

FIGURE 4 is a rear view of the console division.

FIGURE 5 is a partial sectional view taken along the longitudinal axis of the console division.

FIGURE 6 is an enlarged illustration of a portion of FIGURE 5 showing the sealing means between the console body and the floor mounting bracket.

Figure 1:
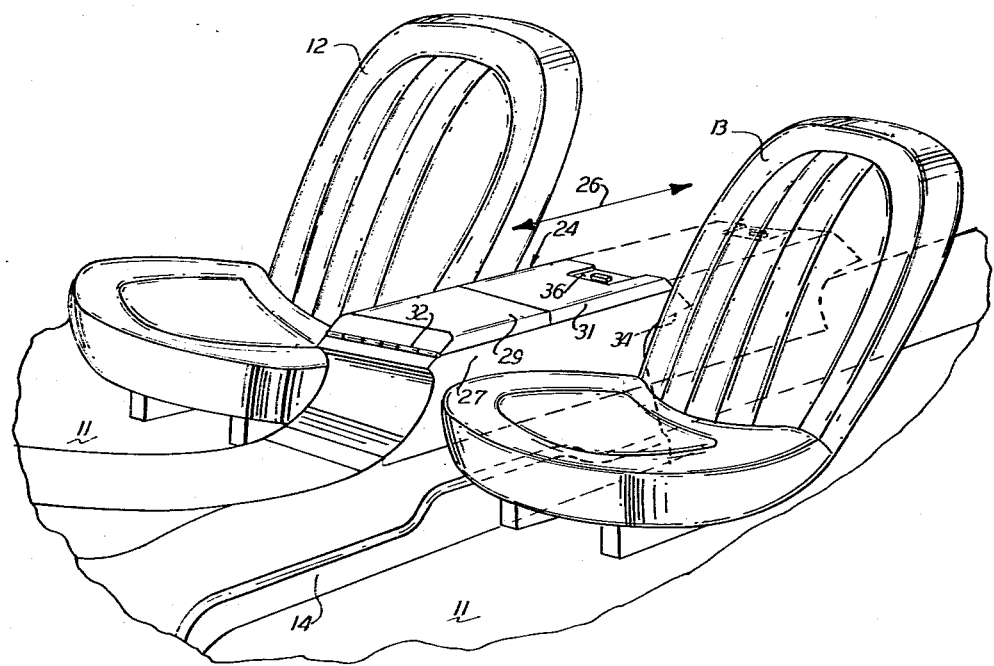
FIGURE 1 is an illustration of the passenger compartment of a vehicle having bucket seats and the console division of this invention.

Referring now in detail to the drawings and in particular to FIGURE 1, there can be seen a passenger compartment of a vehicle having floor 11 with bucket seats 12 and 13 mounted on the floor. Floor 11 has a raised central portion 14 forming a tunnel for the accommodation of elements of the drive train of the vehicle.

Figure 3:
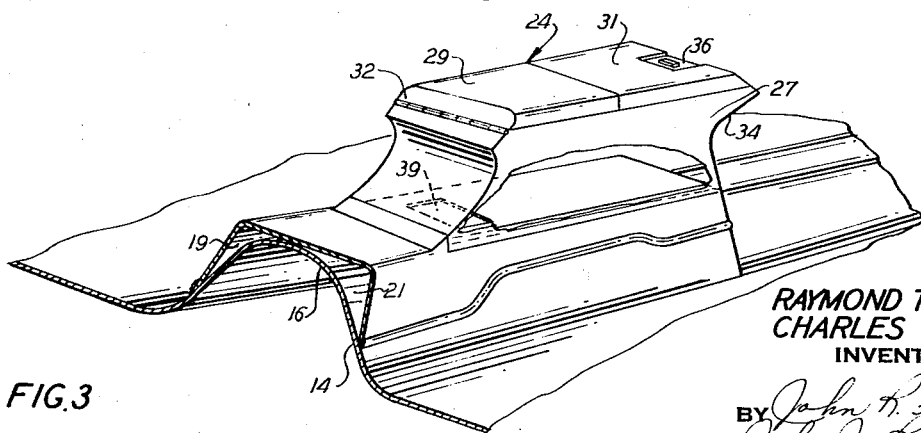
FIGURE 3 is a partial sectional view of the console division.

As can best be seen in FIGURES 3 and 5, mounted on the raised portion 14 of floor 11 is U-shaped mounting bracket 16 to which is attached floor covering 17 by molding strip 18. Raised portion 14 and bracket 16 define air passages 19 and 21 which extend the entire length of the console divider. The spaces designated by numerals 19 and 20 may, of course, be portions of a single passage. The front portion of passages 19 and 21 as seen in FIGURE 3 are adapted to be connected by conventional duct means, not shown, to a heater and/or air conditioner carried by the vehicle. The heater and air conditioner may be of a conventional type and are not shown as they form no part of this invention. The posterior of passages 19 and 21 as seen in FIGURE 4 are covered by vents 22 and 23, respectively. Vents 22 and 23 are of a type that may be opened and closed.

The console itself is indicated by numeral 24 and comprises a body 27 having a cavity 28 formed therein. Console body 27, as will later be described, is capable of sliding movement on bracket 16 as shown by arrow 26 and the ghost outline in FIGURE 1. The top surface of console body 27 comprises two doors 29 and 31 mounted on hinges 32 and 33 respectively, and capable of being opened by movement illustrated by arrows 29a and 31a.

Console body 27 has a rear overhang portion 34 on which is mounted ash tray 36 which is accessible through hole 37 formed in door 31 when door 31 is in a closed position.

The walls of console body 27 are formed from insulating material 38. A preferred material for this installation is polyurethane foam having a polyvinyl chloride outside casing and slush molded to the desired configuration.

Figure 2:
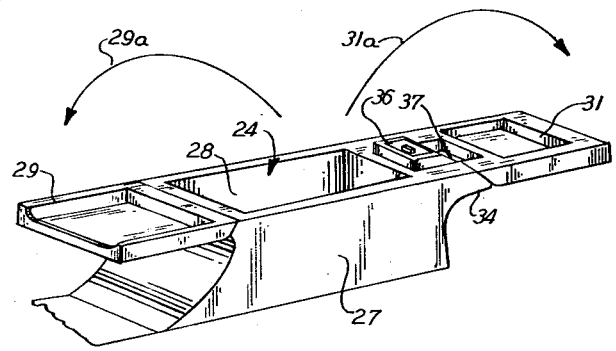
FIGURE 2 illustrates the console body having its doors open to expose the cavity formed therein.

FIGURE 2 illustrates an inlet valve 39 formed in a portion of the top surface of bracket 16 and connecting passages 19 and 21 to air cavity 41. It may thus be seen that when valve 29 is in an open position air may pass from passages 19 and 21 through valve 39 and into air cavity 41. The air can then circuate through aperture 42 (of which there may be a plurality) into space 43 and through vents 44 (as shown by arrows 46), formed in false console body wall 47, and into cavity 28.

As can be seen in FIGURE 5, bracket 16 has at its corners L-shaped channels adapted to receive projections 51 of console body 27. To prevent the leakage of air from air cavity 41, a nylon seal 52, attached to bracket 16 by screw 53, is provided. Projections 51 force seal 52 from its normal position, shown in ghost at 52a, in order that a tight seal may be accomplished.

Bracket 16 has formed in its top surface, along a portion thereof, channel 54. Connected to channel 54 is an outer race 55 carrying projections 56 which bear against balls 58. Inner race 57 is rigidly attached to floor 40 of console body 27 and also carries projections which bear against balls 58 so that console body 27 may slide smoothly along bracket 16. Floor tunnel portion 14 has a flat top surface along a portion of its length corresponding to the length of channel 54 to aid in supporting said channel.

It is obvious that channel 54 and races 55 and 57 do not extend along the entire length of console body 27 but are of such a limited length that will permit the desired distance of sliding movement by console body 27. Inlet valve 39, of course, is positioned in a portion of the top surface of bracket 16 along which channel 54 is not formed.

It may thus be seen that applicants' invention provides a sliding console body which can be moved to a position in which it will not interfere with movement of the passengers in the front portion of the passenger compartment. The console does not interfere with the passage of air to the rear portion of the passenger compartment. The cavity formed in the console body may have the temperature therein controlled according to the desires of the vehicle operator.

It is understood that various changes and modifications may be made without departing from the spirit and scope of the present invention as defined by the appended claims.

We claim:

1. In a vehicle body, a passenger compartment having a floor and forward facing bucket-type seats mounted on said floor, a generally elongate console division positioned between said seats so that its longitudinal axis is parallel to the longitudinal axis of the vehicle, said console division comprising a fixed mounting bracket mounted on said floor and extending from forward of said seats to rearward of said seats, a console body mounted on said bracket, cooperating slide means carried by said bracket and said console body along a portion of the bottom surface of the latter for promoting sliding movement of said console body lengthwise along said fixed mounting bracket from a first position between said seats to a second position rearward of said seats.

2. In a vehicle body, a passenger compartment having a floor and bucket-type seats mounted on said floor, a console division positioned between said seats comprising a console body having a cavity formed therein, movable means forming the top surface of said console body for access to said cavity, said console division having at least one passage extending therethrough, and valve means between said passage and said cavity operable to control the admission of air to said cavity.

3. In a vehicle body, a passenger compartment having a floor and bucket-type seats mounted on said floor, a generally elongate console division positioned between said seats with its longitudinal axis parallel to the longitudinal axis of the vehicle, said console division comprising a console body having a cavity formed therein and a top surface movable for access to said cavity, at least one longitudinal air passage extending through said console division for circulating air from the front portion of the passenger compartment to the rear portion thereof, valve means between said air passage and said cavity operable to control the admission of air to said cavity, and vents formed in said cavity for the passage of air from said cavity to the rear portion of the passenger compartment.

4. In a vehicle body according to claim 3 wherein said console body is formed of insulating material.

5. In a vehicle body according to claim 3 and further including means to block the flow of air through said air passage to thereby increase the flow of air through said cavity.

6. In a vehicle body, a passenger compartment having a floor and bucket-type seats mounted on said floor, a console division between said seats comprising a mounting bracket mounted on said floor, a console body mounted on said bracket, said console body having a cavity formed therein and a movable top surface for access to said cavity, means carried by said bracket and said console body for generally horizontal movement of the latter along the former, the floor and the mounting bracket defining at least one ventilation air passage, said passage extending the length of the console division, and valve means connecting said passage and said cavity operable to admit air to said cavity.

7. In a vehicle body, a passenger compartment having a floor and bucket-type seats mounted on said floor, a console division positioned between said seats so that its longitudinal axis is parallel to the longitudinal axis of the vehicle, said console assembly comprising a fixed mounting bracket mounted on said floor, a console body mounted on said bracket and having a cavity formed therein and a top surface movable for access to said cavity, cooperating slide means carried by said bracket and said console body along a portion of the bottom surface of the latter for sliding movement of said console body longitudinally along said fixed mounting bracket, at least one longitudinal ventilation air passage extending through said console assembly for conveying air from the front portion of the passenger compartment to the rear portion thereof, valve means in the bottom surface of the console body connecting said passage and said cavity to admit air to said cavity, and vents formed in said console body for the passage of air from said cavity to the rear portion of the passenger compartment.

References Cited

UNITED STATES PATENTS

| | | | |
|---|---|---|---|
| 2,988,206 | 6/1961 | Olson | 224—42.42 |
| 3,022,883 | 2/1962 | Barton | 224—42.42 |
| 3,109,537 | 11/1963 | Larkin | 206—19.5 |
| 3,136,461 | 6/1964 | Gregg | 224—42.42 |
| 3,177,033 | 4/1965 | Daniels | 206—19.5 |
| 3,207,567 | 9/1965 | Brady | 296—1 |

BENJAMIN HERSH, *Primary Examiner.*

PHILIP GOODMAN, *Examiner.*